United States Patent [19]

Bills, Jr.

[11] Patent Number: 5,215,426

[45] Date of Patent: Jun. 1, 1993

[54] TRAILER INCLUDING A HINGED RAMP TAIL

[75] Inventor: Joseph W. Bills, Jr., Trussville, Ala.

[73] Assignee: Dakota Manufacturing Co., Inc., Mitchell, S. Dak.

[21] Appl. No.: 817,754

[22] Filed: Jan. 8, 1992

[51] Int. Cl.⁵ .............................................. B60P 1/43
[52] U.S. Cl. .................................................. 414/537
[58] Field of Search .................... 414/537, 474–476, 414/482–485; 14/71.1, 71.3, 71.7

[56] References Cited

U.S. PATENT DOCUMENTS

| | | | |
|---|---|---|---|
| 2,717,707 | 9/1955 | Martin | 414/475 |
| 2,753,064 | 7/1956 | Lesser | 414/475 |
| 2,789,714 | 4/1957 | Norris | 414/537 X |
| 3,934,740 | 1/1976 | Rumell | 414/484 |
| 3,987,919 | 10/1976 | Weeks et al. | 414/475 X |
| 4,305,694 | 12/1981 | Chan | 414/537 X |
| 4,372,727 | 2/1983 | Fredrickson | 414/537 |
| 4,516,902 | 5/1985 | Matson | 414/483 X |
| 4,568,235 | 2/1986 | Bills, Jr. | 414/477 |
| 5,013,056 | 5/1991 | Landoll et al. | 414/475 X |
| 5,094,583 | 3/1992 | Bills, Jr. et al. | 414/537 |

FOREIGN PATENT DOCUMENTS

| | | | |
|---|---|---|---|
| 2544700 | 10/1984 | France | 414/475 |
| 26625 | 12/1963 | German Democratic Rep. | 414/475 |

Primary Examiner—David A. Bucci
Attorney, Agent, or Firm—Zarley, McKee, Thomte, Voorhees & Sease

[57] ABSTRACT

A trailer comprising a main trailer portion having a ramp tail hingedly secured to the rearward end thereof. A first axle and suspension system is positioned beneath the main portion of the trailer forwardly of the hinge point of the ramp tail. A second axle and suspension system is positioned rearwardly of the first axle and is located beneath the hinge point of the ramp tail when it is desired to pivotally move the ramp tail. During highway usage, the second axle may be slidably moved beneath the ramp tail so as to increase the distance between the two axles.

4 Claims, 7 Drawing Sheets

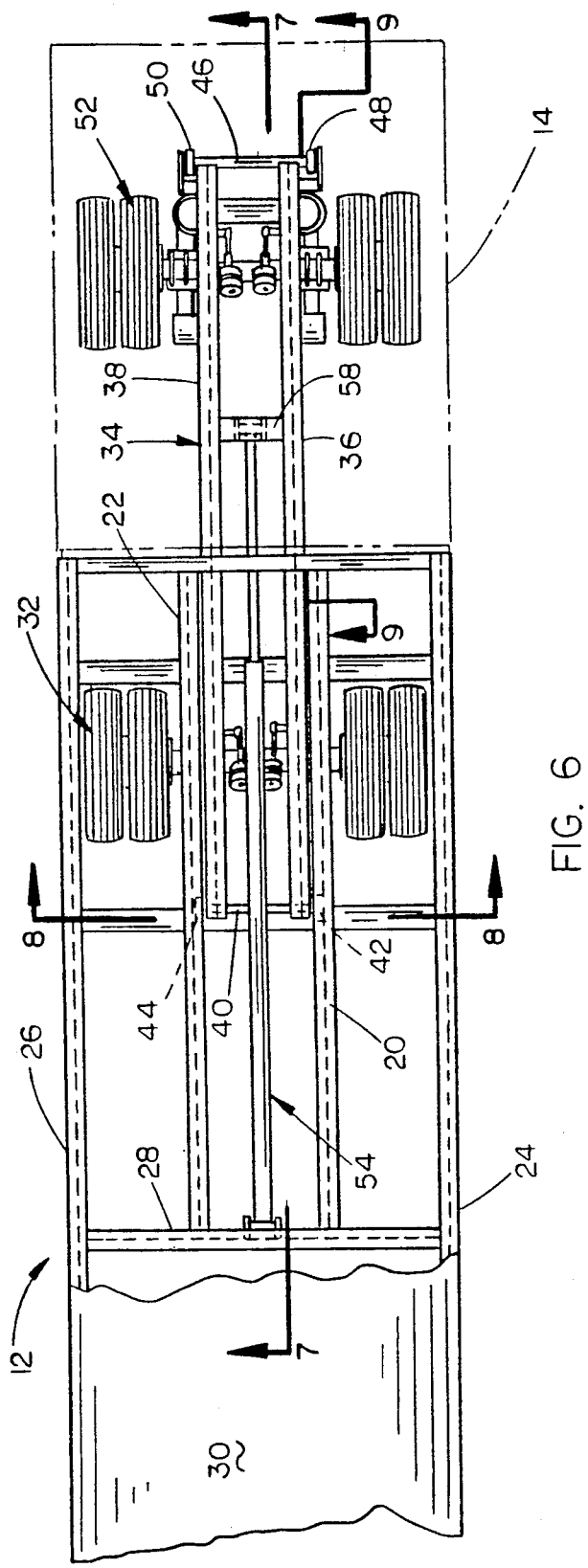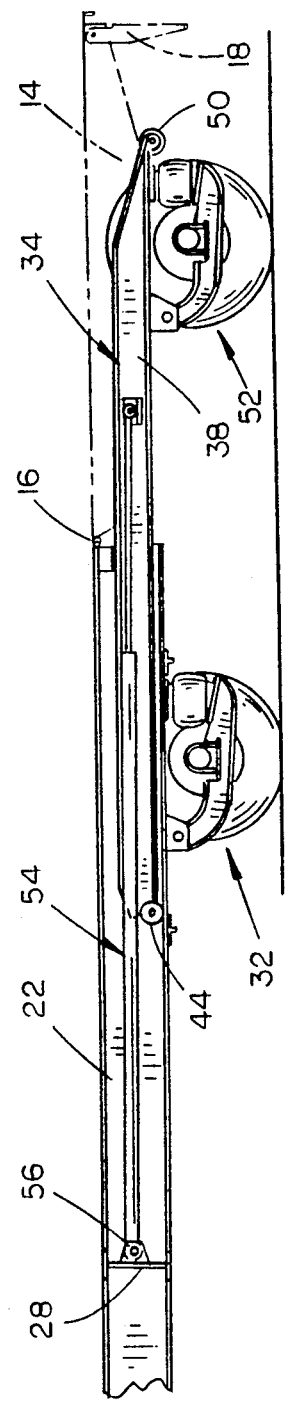
FIG. 6
FIG. 7

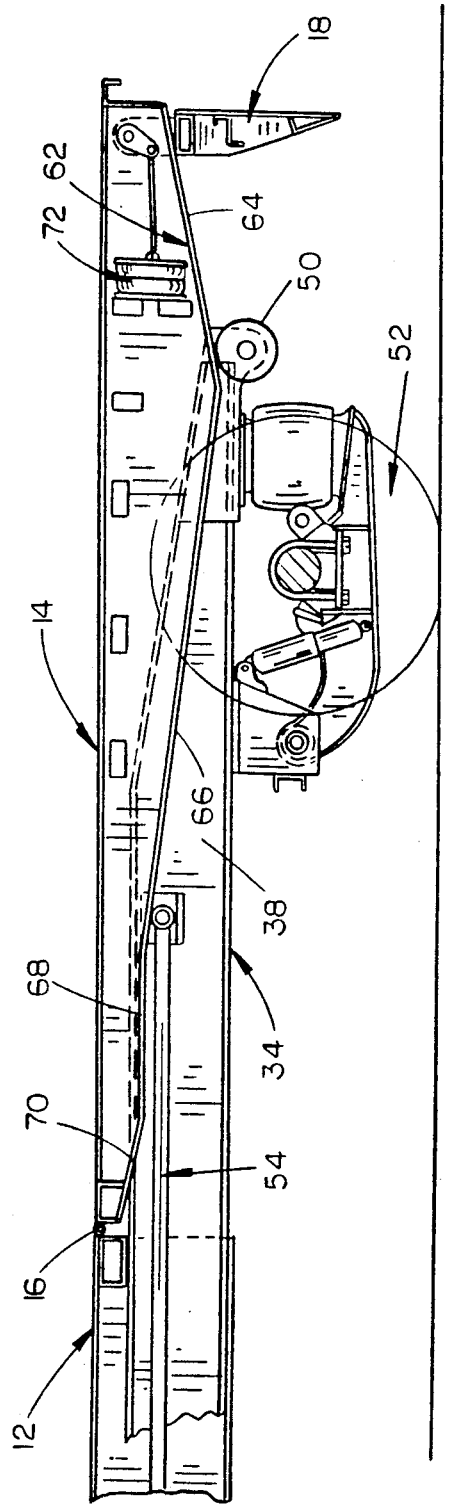
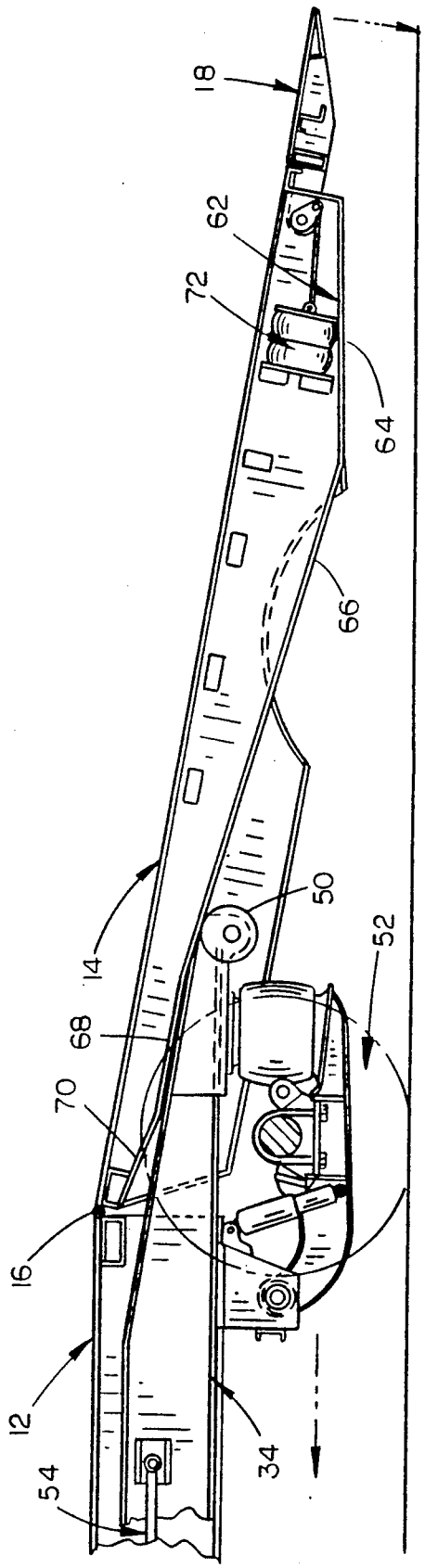
FIG. 9
FIG. 10

1

TRAILER INCLUDING A HINGED RAMP TAIL

BACKGROUND OF THE INVENTION

This invention relates to a trailer and more particularly to a trailer having a ramp tail.

Many types of trailers have been previously provided for transporting large equipment over the road. The equipment is normally loaded onto the trailer from the rearward end thereof. Folding ramps of the like have been provided at the rear end of the trailer to enable the equipment to move onto the trailer bed. One such type of trailer is disclosed in U.S. Pat. No. 4,372,727.

In most of the trailers which have folding ramp tails, a pair of axles are located at the rear of the trailer just forwardly of the hinge point of the ramp tail. In the conventional trailers having ramp tails, the rearwardmost axle must be located sufficiently forward enough so that the ramp tail may pivotally move downwardly. The requirement that the rear axles be located close together near the rear end of the main deck of the trailer and adjacent the hinge point of the ramp tail results in a less than desirable weight distribution for the trailer and can reduce the maximum payload that the trailer can carry.

It is therefore a principal object of the invention to provide an improved trailer having a folding ramp tail.

A further object of the invention is to provide a trailer having a pair of axles located at the rear of the trailer with one of the axles having the ability to be moved beneath the tail ramp during highway usage.

Yet another object of the invention is to provide a trailer of the type described which results in a better weight distribution capability for the trailer.

Yet another object of the invention is to provide a trailer of the type described which permits the trailer to carry a greater payload.

Another object of the invention is to provide a trailer which has the ability to spread the rear axles thereof.

These and other objects will be apparent to those skilled in the art.

BRIEF DESCRIPTION OF THE DRAWINGS

FIG. 6 is a topped elevational view of the trailer of this invention with the rear axle having been slidably moved rearwardly:

FIG. 7 is a sectional view as seen on line 7—7 of FIG. 6:

FIG. 9 is a sectional view as seen on line 9—9 of FIG. 6; and

FIG. 10 is a sectional view similar to FIG. 9 except that the rear axle has been slidably moved forwardly from the position of FIG. 9.

SUMMARY OF THE INVENTION

A trailer is disclosed which includes a main frame portion having rearward and forward ends with means at the forward end of the main frame portion for connection to a prime mover such as a truck or the like. A ramp tail is hingedly connected to the rearward end of the main frame portion and may be moved from a horizontal load carrying position to an inclined unloading and loading position. A first axle assembly including a suspension system is mounted on the main frame portion forwardly of the hinge point of the ramp tail. A second axle assembly including a suspension means is positioned rearwardly of the first axle assembly and is located approximately beneath the hinge point of the ramp tail when it is desired to pivot the ramp tail to is unloading/loading position. The second axle assembly and suspension system may be slidably moved rearwardly beneath the ramp tail during highway usage of the trailer thereby resulting in a better weight distribution for the trailer which permits the trailer to carry a greater payload. The fact that the second axle may be moved beneath the ramp tail during highway usage also ensures that the ramp tail will not inadvertently pivot or hingedly move downwardly during highway usage.

DESCRIPTION OF THE PREFERRED EMBODIMENT

Figure 1:
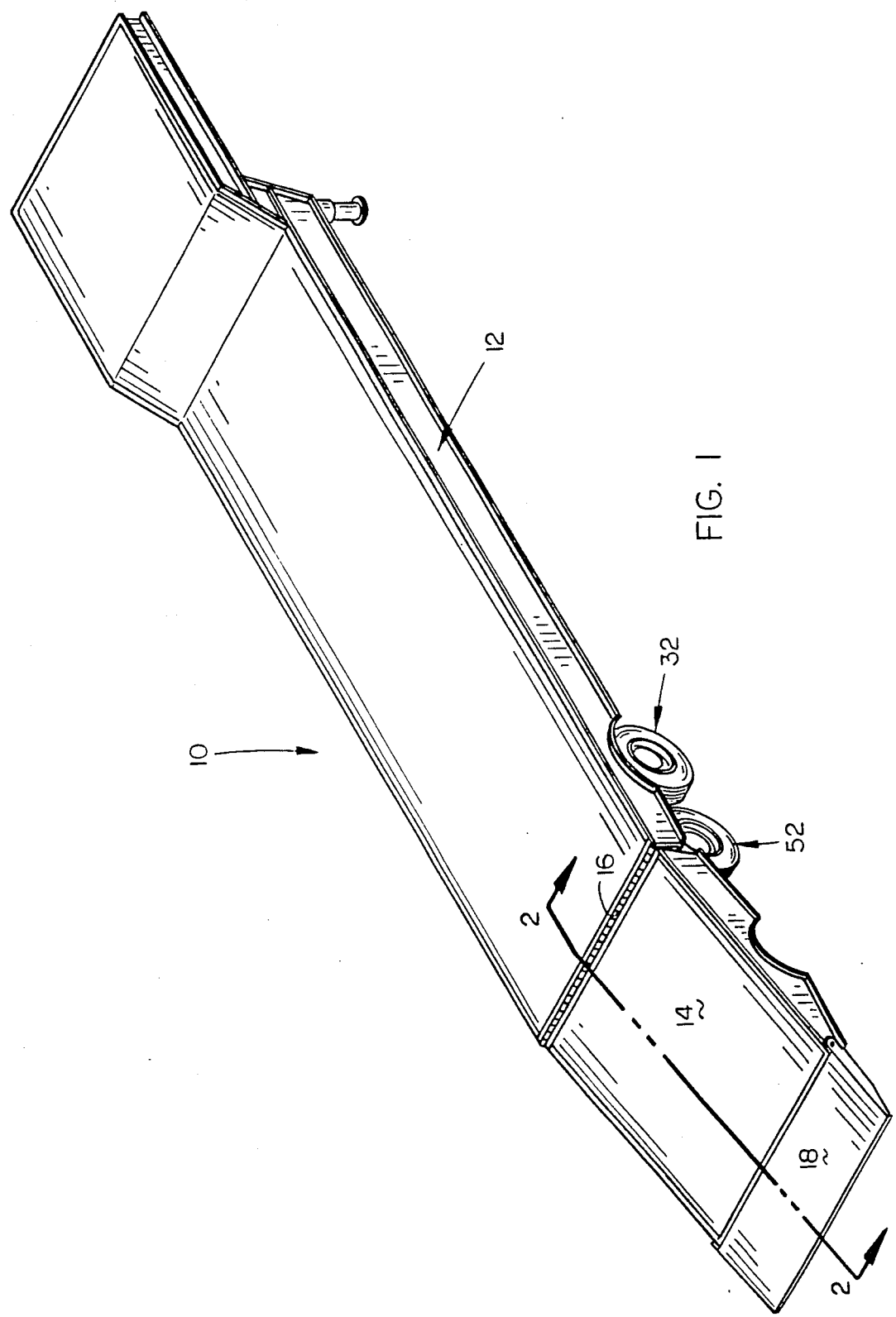
FIG. 1 is a rear perspective view of the trailer of this invention.

Referring to FIG. 1, the numeral 10 generally designates the trailer of this invention including a main frame portion 12 having a powered ramp tail 14 pivotally secured thereto at 16. Ramp tail 14 has a flip tail 18 pivotally secured to the rearward end thereof as will be described in more detail hereinafter. Trailer 10 includes means at the forward end thereof for attachment to a prime mover such as a truck or the like.

As seen in FIG. 6, main frame portion 12 includes a pair of longitudinally extending I-beams 20 and 22 positioned at the center thereof. Main frame portion 12 also includes a pair of longitudinally extending frame members 24 and 26 at the sides thereof. The main frame portion 12 also includes a plurality of transversely extending frame members 28 which extend between the side frame members 24 and 26. Deck 30 is supported on the frame members 20, 22, 24 and 26 in conventional fashion.

The numeral 32 refers to a front suspension system which is mounted at the rearward end of the main frame portion 12 as illustrated in the drawings. Suspension system 32 is conventional in design and will not be described in detail for that reason.

Figure 4:
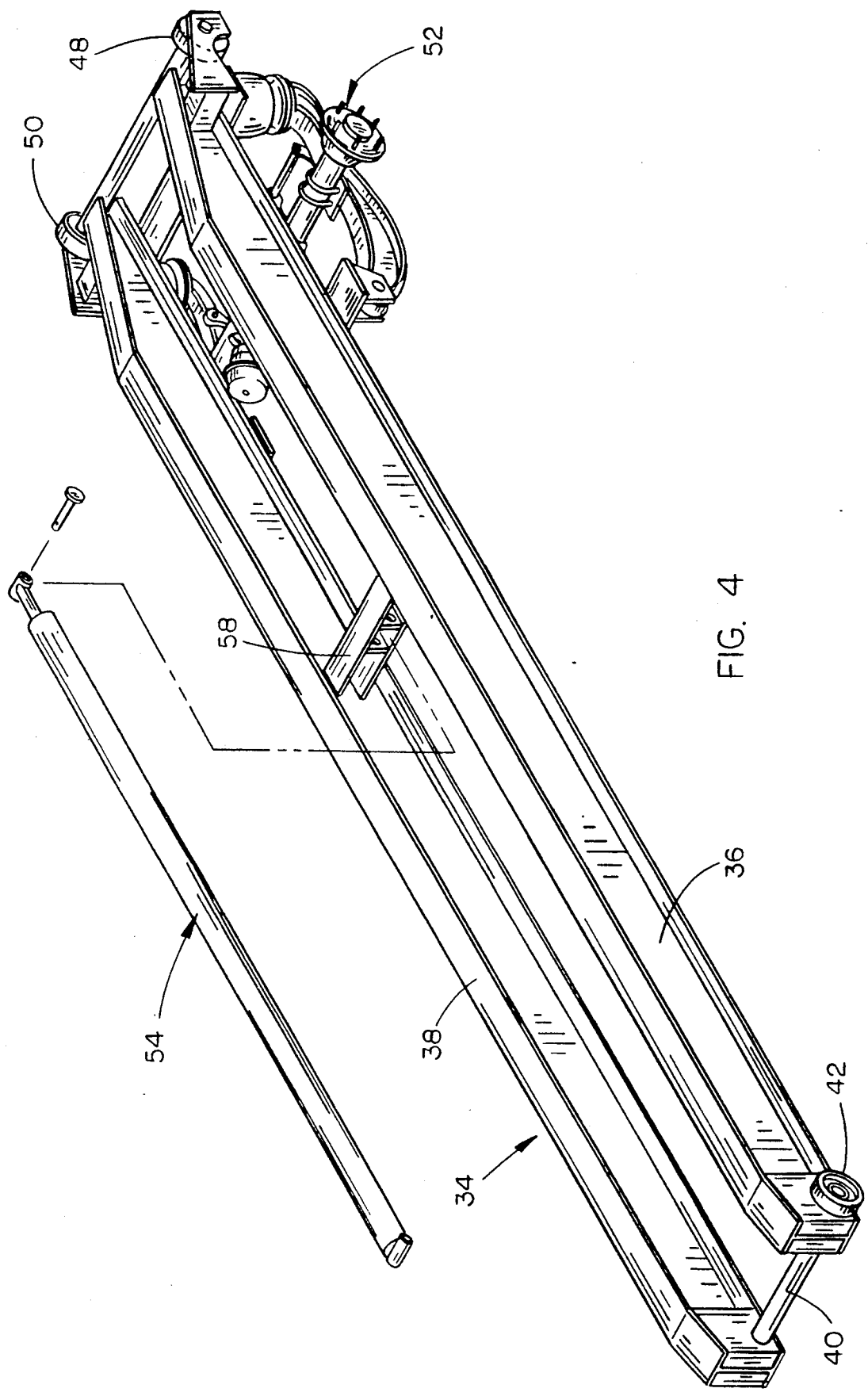
FIG. 4 is a front perspective view of the slider assembly of this invention.

The numeral 34 refers to a slider assembly including longitudinally extending frame members 36 and 38. Shaft 40 is secured to and extends between the forward ends of the frame members 36 and 38 and has rollers 42 and 44 mounted on the opposite ends thereof which are adapted to roll upon the inner top portions of the bottom flanges of frame members 20 and 22 respectively. Shaft 46 is secured to and extends between the rearward ends of frame members 36 and 38 and has rollers 48 and 50 mounted on the outer ends thereof. Suspension system 52 is mounted on the frame members 36 and 38 for movement therewith and is identical to the suspension system 32. Hydraulic cylinder 54 is connected at its base end to frame member 28 at 56 and is connected at its rod end to frame member 58 which is secured to and extends between frame members 36 and 38 as illustrated in FIG. 4. Extension of the hydraulic cylinder 54 causes the slider assembly 34 and the suspension system 52 to be moved forwardly with respect to the main frame portion 12.

Ramp tail 14 includes a pair of longitudinally extending center beams 60 (not shown) and 62, the forward ends of which are pivotally connected to the rearward end of the main frame portion 12 at 16. Inasmuch as the center beams 60 and 62 are identical, only center beam 62 will be described in detail. The underside of the bottom flange of the center beam 62 includes an upwardly extending portion 64 at its rearward end and a portion 66 forwardly thereof which extends upwardly and forwardly therefrom as seen in FIG. 9. A horizontally disposed portion 68 is provided forwardly of portion 66 and an inclined portion 70 is provided forwardly of horizontally disposed portion 68. Roller 50 is adapted to roll upon the underside of the bottom flange of center beam 62 to cause the ramp tail 14 to be pivotally moved with respect to main frame portion 12 as hydraulic cylinder 54 is retracted and extended.

As seen in FIG. 9, when the slider assembly 34 is completely extended, roller 50 is positioned beneath the forward end of inclined portion 64 to maintain the ramp tail 14 in a horizontal position. As hydraulic cylinder 54 is retracted from the position of FIG. 9 to the position of FIG. 10, roller 50 rolls upon portion 66 so that the ramp tail 14 pivotally moves downwardly from the position of FIG. 9 towards the position of FIG. 10. The hydraulic cylinder 54 is retracted until the roller 50 is positioned sufficiently forwardly enough with respect to the center beam 62 so that portion 64 of center beam 62 may rest upon the ground or other supporting surface. Roller 48 similarly rolls on the underside of centerbeam 60. When the roller 50 is in the position of FIG. 9, ramp tail 14 cannot pivotally move downwardly into ground engagement.

Flip tail 18 normally hangs in the position seen in FIG. 9 when the trailer is being moved over the road so as to serve as a bumper. When it is desired to move the ramp tail 14 downwardly into ground engagement, the air actuator assembly 72 automatically pivotally moves the flip tail 18 from the position of FIG. 9 to the position of FIG. 10 so that the flip tail 18 forms an extension of the deck of ramp tail 14.

Figure 2:
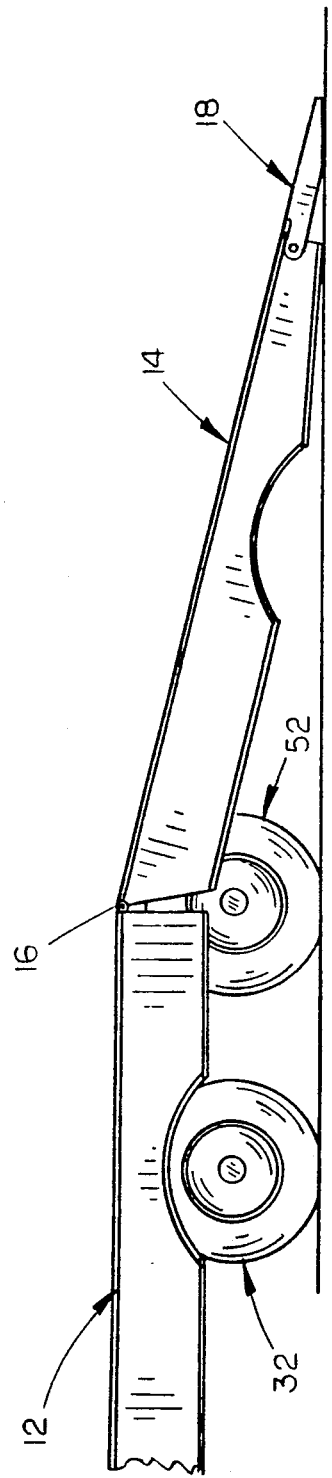
FIG. 2 is a side view as seen on lines 2—2 of FIG. 1.
Figure 3:
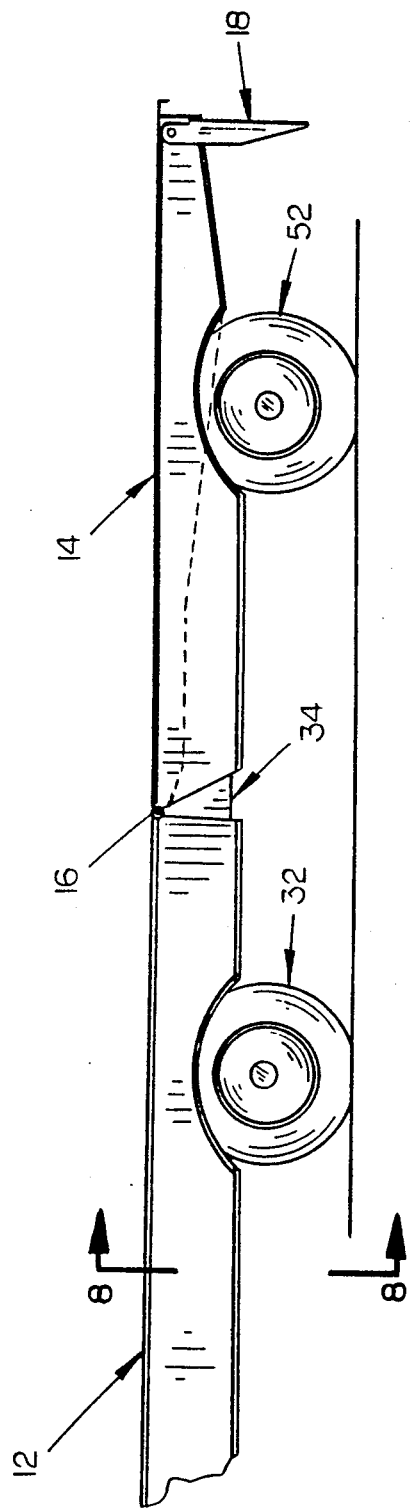
FIG. 3 is a side view similar to FIG. 2 except that the rearwardmost axle has been slidably moved rearwardly with respect to the front axle.

When the ramp tail 14 is in the position of FIG. 3, the rear suspension system 52 is "spread" a considerable distance rearwardly of the suspension system 32 thereby achieving a better weight distribution for the load on the trailer than when the suspension systems are closely positioned as illustrated in FIG. 2. When the slider assembly 34 has moved the rear suspension system 52 to the position of FIG. 3, a greater amount of weight may be placed on the ramp tail than otherwise possible and the positioning of the suspension system 52 prevents the ramp tail 14 from inadvertently moving downwardly as the trailer is moving over the road.

Figure 5:
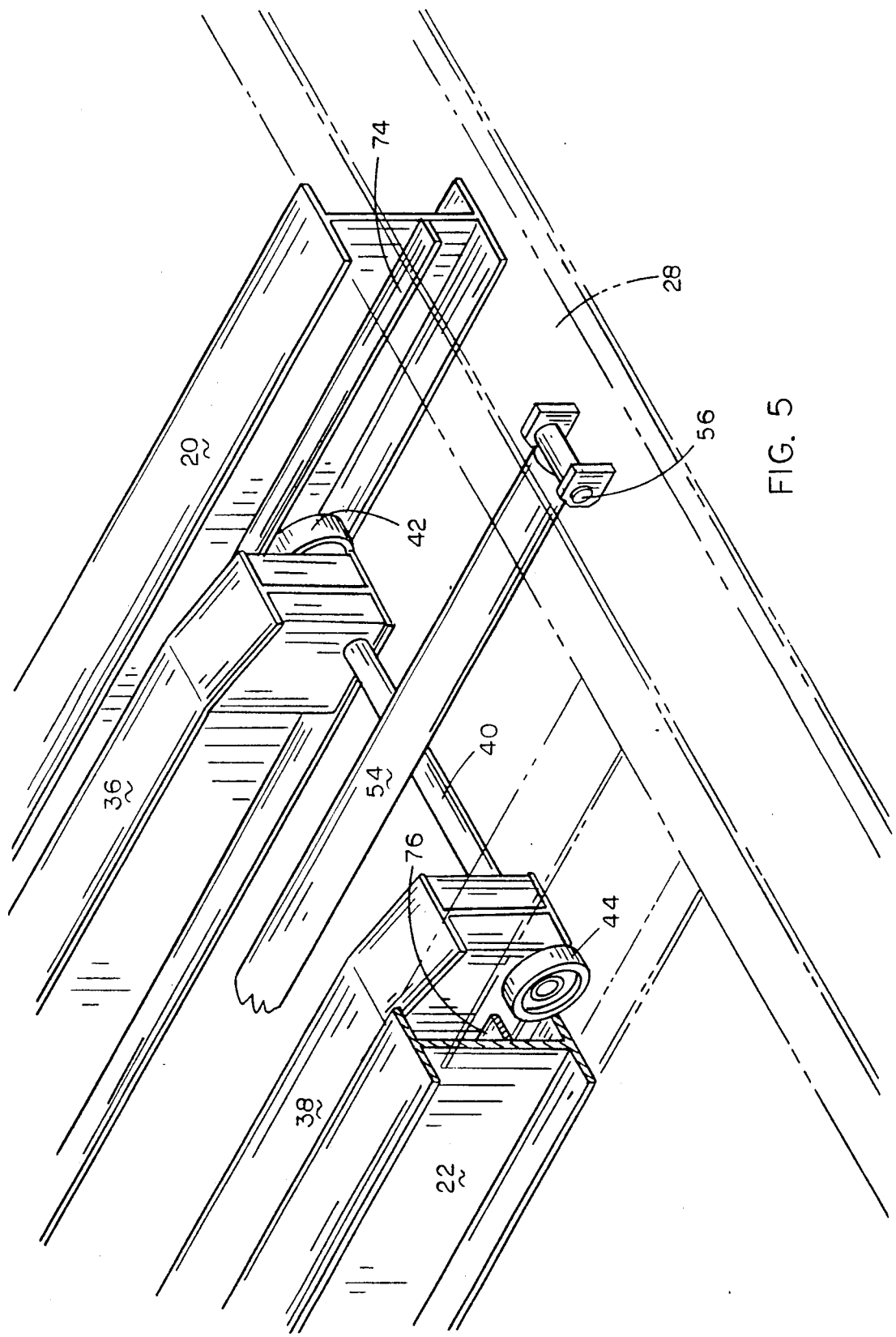
FIG. 5 is a front perspective view of a portion of the slider assembly and its relationship to the longitudinal beams of the trailer.
Figure 8:
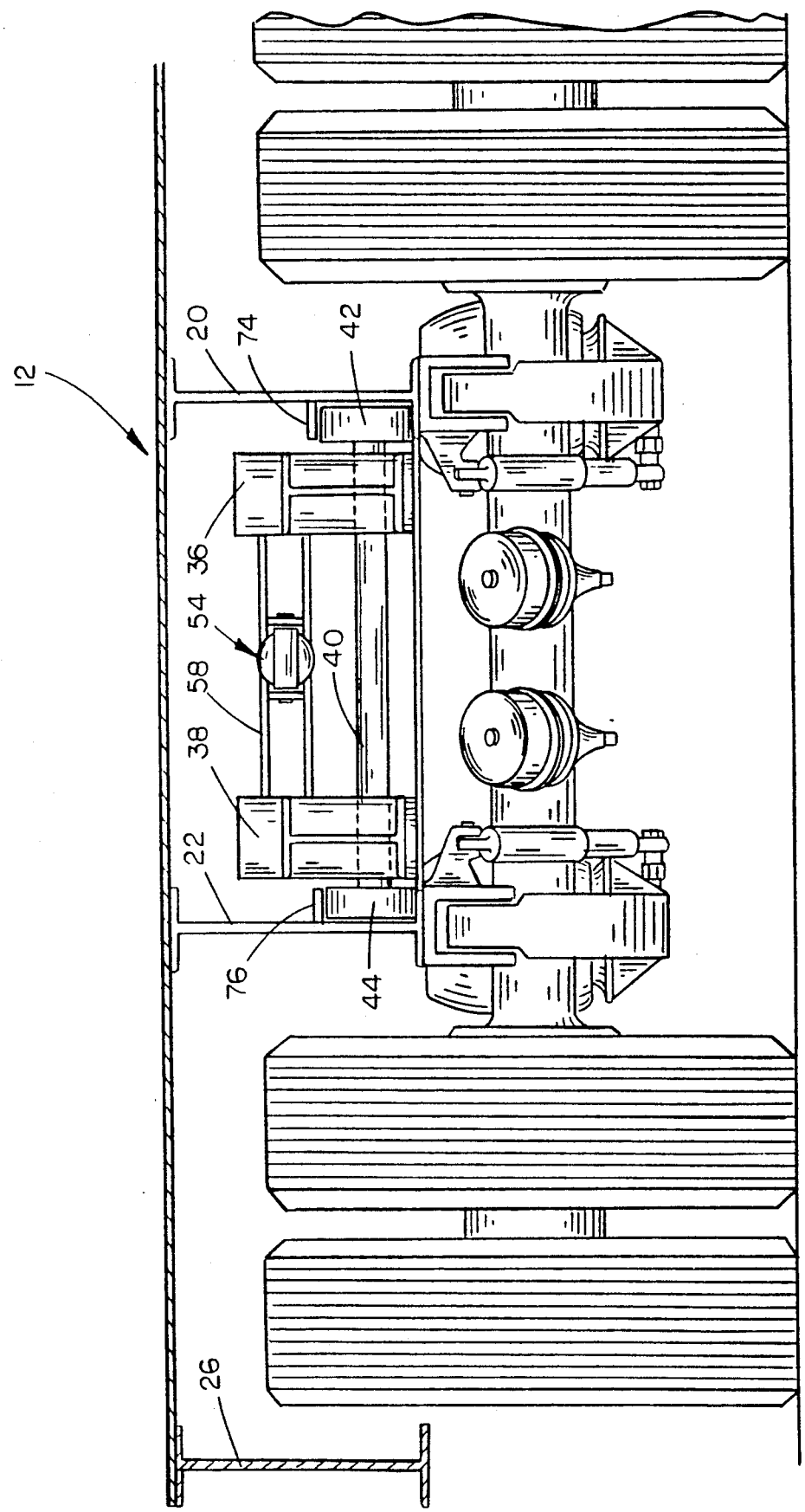
FIG. 8 is a sectional view as seen on line 8—8 of FIG. 6.

When it is desired to either load the trailer or unload the trailer, hydraulic cylinder 54 is retracted so that the slider assembly 34 is moved forwardly relative to main frame portion 12. The retraction of cylinder 54 causes the slider assembly 34 to move forwardly with the rollers 42 and 44 rolling upon the bottom flanges of the frame member 20 and 22. As seen in FIG. 5, frame members 20 and 22 are provided with elongated angles or retainers 74 and 76 to prevent upward movement of the rollers 42 and 44 relative to the frame members 20 and 22.

As the retraction of the cylinder 54 continues, rollers 48 and 50 roll upon the undersides of the center beams 60 and 62 so that the ramp tail 14 may pivotally move from the position of FIG. 9 towards the position of FIG. 10. Hydraulic cylinder 54 would be retracted until the rearward end of the ramp tail 14 is moved into ground engagement. When the ramp tail 14 is in its lowered position, the trailer may be loaded or unloaded. When it is desired to move the trailer over the road, slider assembly 34 is again moved rearwardly relative to main frame portion 12.

Thus, it can be seen that the invention accomplishes at least all of its stated objectives.

I claim:

1. A trailer including a hinged ramp tail, comprising,
a frame having rearward and forward ends,
means on the forward end of said frame means for connecting said frame to a prime mover,
a ramp tail hingedly connected to the rearward end of said frame and being selectively movable between first and second positions, said ramp tail having rearward and forward ends,
said ramp tail being substantially horizontal when in its said first position,
said ramp tail being inclined downwardly and rearwardly with respect to said frame when in its said second position,
a first ground engaging suspension system secured to said frame, adjacent the rearward end thereof, for supporting said frame,
a second ground engaging suspension system operatively movably secured to said frame and positioned rearwardly of said first ground engaging system,
said second ground engaging suspension system being selectively movable between first and second positions,
said second ground engaging suspension system being positioned rearwardly of the forward end of said ramp tail to prevent said ramp tail from moving to its said second position, when said second ground engaging suspension system is in its said first position,
said second ground engaging suspension system being positioned adjacent the forward end of said ramp tail when said second ground engaging suspension system is in its second position,
and means operatively interconnecting said second ground engaging suspension system and said ramp tail to permit said ramp tail to move to its said second position when said second ground engaging suspension system is moved to its said second position.

2. The trailer of claim 1 wherein said second ground engaging suspension system is operatively secured to a slider assembly which is slidably mounted on said frame.

3. The trailer of claim 2 wherein said slider assembly has rearward and forward ends and wherein rollers are provided on said slider assembly which roll upon said frame.

4. The trailer of claim 3 wherein said ramp tail has at least one center beam having upper and lower ends and rearward and forward ends, at least one of the rollers on said slider assembly engaging the lower end of said center beam for moving said ramp tail as said slider assembly is moved with respect to said frame.

* * * * *